US012639417B2

(12) United States Patent
Mukherjee et al.

(10) Patent No.: US 12,639,417 B2
(45) Date of Patent: May 26, 2026

(54) AUTOMATED MONITORING AND UPDATING OF PASSCODES FOR APPLICATIONS AND WEB SITES/SERVICES

(71) Applicant: BANK OF AMERICA CORPORATION, Charlotte, NC (US)

(72) Inventors: Maharaj Mukherjee, Poughkeepsie, NY (US); George Anthony Albero, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 101 days.

(21) Appl. No.: 18/402,177

(22) Filed: Jan. 2, 2024

(65) Prior Publication Data

US 2025/0217471 A1      Jul. 3, 2025

(51) Int. Cl.
*G06F 21/00* (2013.01)
*G06F 21/46* (2013.01)

(52) U.S. Cl.
CPC .................................. *G06F 21/46* (2013.01)

(58) Field of Classification Search
None
See application file for complete search history.

(56) References Cited

U.S. PATENT DOCUMENTS

| 8,412,931 B2 * | 4/2013 | Vedula | .................... | H04L 63/08 |
| | | | | 713/161 |
| 9,760,697 B1 | 9/2017 | Walker | | |
| 9,985,941 B2 | 5/2018 | Childress et al. | | |
| 10,108,811 B1 | 10/2018 | Walker | | |
| 10,146,931 B1 | 12/2018 | Kronrod et al. | | |
| 10,169,937 B1 | 1/2019 | Zwink et al. | | |
| 10,530,580 B1 | 1/2020 | Walker | | |
| 2010/0031343 A1 * | 2/2010 | Childress | ................ | G06F 21/46 |
| | | | | 726/18 |
| 2010/0325687 A1 * | 12/2010 | Iverson | .................... | G06F 21/41 |
| | | | | 717/134 |
| 2013/0014236 A1 * | 1/2013 | Bingell | ............... | H04L 63/0846 |
| | | | | 726/6 |
| 2016/0191477 A1 * | 6/2016 | Kundu | ................ | H04L 63/0846 |
| | | | | 726/6 |
| 2018/0004934 A1 * | 1/2018 | Venkataramani | ..... | H04L 9/0891 |

(Continued)

*Primary Examiner* — Jeffery L Williams

(74) *Attorney, Agent, or Firm* — Moore & Van Allen PLLC; Nicholas C. Russell

(57) ABSTRACT

Automated updating/changing of passcodes based on network, application and/or website specific passcode rules. Passcode rules for passcodes stored in a passcode vault are identified, including passcode structure rules and passcode expiration rules. Subsequently the expiration dates trigger automatic update/change of the passcodes in accordance with the passcode structure rules. Additionally, networks, applications and/or web sites/services associated with the passcodes may be monitored for security threats, which, when detected, trigger automatic update/change of the passcodes in accordance with the passcode structure rules. Such updating/changing of the passcodes may be transparent to the users or the users may receive notification alerts. In further embodiments of the networks, applications and/or web sites services are monitored for changes to their respective passcode rules, such that future automated passcode updates/changes may occur in accordance with the updated passcode rules.

17 Claims, 9 Drawing Sheets

(56)                    References Cited

U.S. PATENT DOCUMENTS

| | | | |
|---|---|---|---|
| 2018/0322275 A1 | 11/2018 | Li et al. | |
| 2020/0036705 A1* | 1/2020 | Lee | G06F 16/27 |
| 2020/0104500 A1* | 4/2020 | Martino | G06F 8/65 |
| 2020/0380115 A1* | 12/2020 | Knight | G06F 21/46 |
| 2020/0410086 A1 | 12/2020 | Harmon | |
| 2021/0334357 A1* | 10/2021 | Woo | G06F 21/31 |
| 2022/0237282 A1 | 7/2022 | Tzur-David et al. | |
| 2023/0169161 A1* | 6/2023 | Konda | G06F 21/45 |
| | | | 726/26 |
| 2024/0031356 A1* | 1/2024 | Jiang | H04L 67/02 |

* cited by examiner

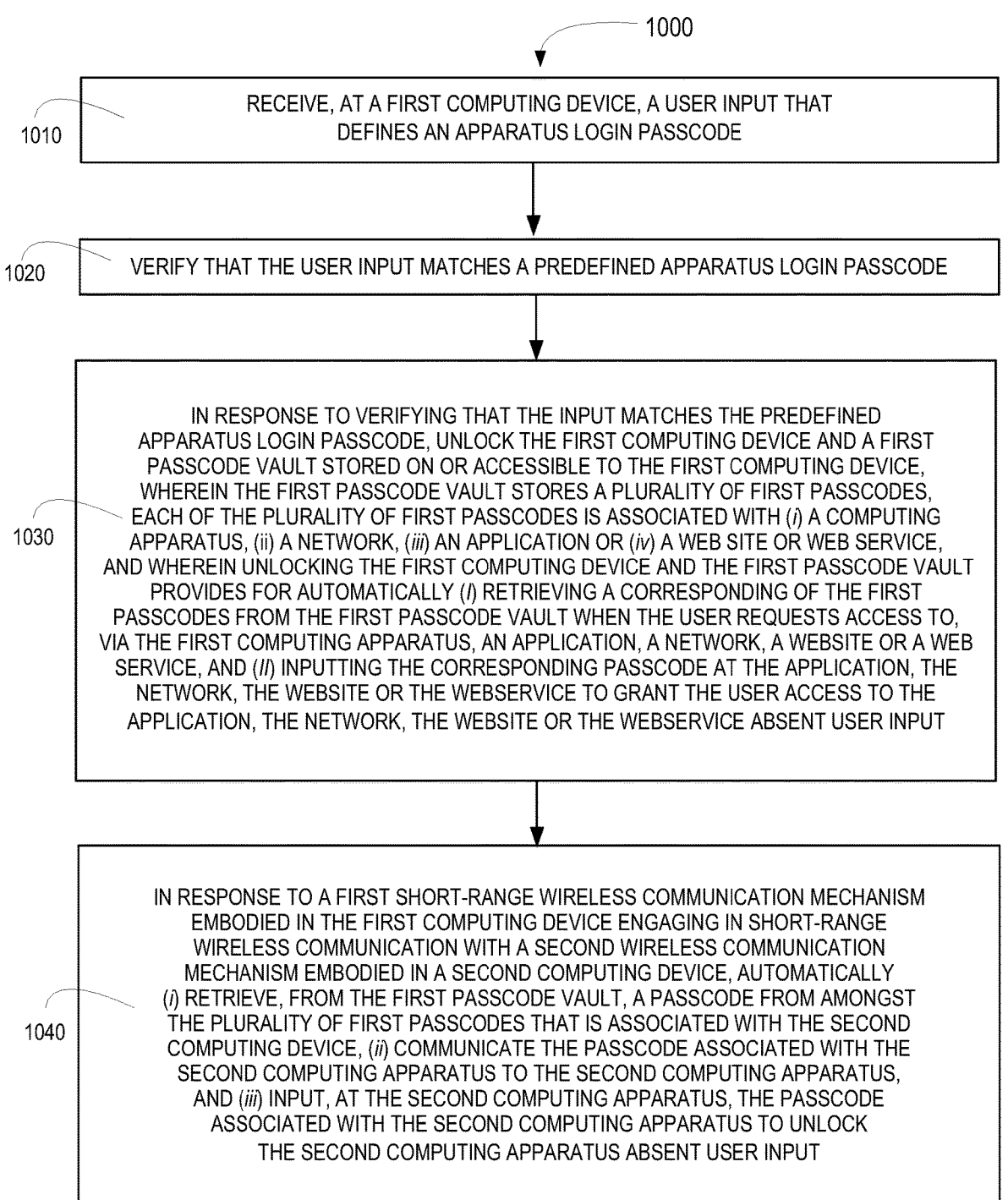

1000

1010  RECEIVE, AT A FIRST COMPUTING DEVICE, A USER INPUT THAT
DEFINES AN APPARATUS LOGIN PASSCODE

1020  VERIFY THAT THE USER INPUT MATCHES A PREDEFINED APPARATUS LOGIN PASSCODE

1030  IN RESPONSE TO VERIFYING THAT THE INPUT MATCHES THE PREDEFINED
APPARATUS LOGIN PASSCODE, UNLOCK THE FIRST COMPUTING DEVICE AND A FIRST
PASSCODE VAULT STORED ON OR ACCESSIBLE TO THE FIRST COMPUTING DEVICE,
WHEREIN THE FIRST PASSCODE VAULT STORES A PLURALITY OF FIRST PASSCODES,
EACH OF THE PLURALITY OF FIRST PASSCODES IS ASSOCIATED WITH (*i*) A COMPUTING
APPARATUS, (ii) A NETWORK, (*iii*) AN APPLICATION OR (*iv*) A WEB SITE OR WEB SERVICE,
AND WHEREIN UNLOCKING THE FIRST COMPUTING DEVICE AND THE FIRST PASSCODE VAULT
PROVIDES FOR AUTOMATICALLY (*I*) RETRIEVING A CORRESPONDING OF THE FIRST
PASSCODES FROM THE FIRST PASSCODE VAULT WHEN THE USER REQUESTS ACCESS TO,
VIA THE FIRST COMPUTING APPARATUS, AN APPLICATION, A NETWORK, A WEBSITE OR A WEB
SERVICE, AND (*II*) INPUTTING THE CORRESPONDING PASSCODE AT THE APPLICATION, THE
NETWORK, THE WEBSITE OR THE WEBSERVICE TO GRANT THE USER ACCESS TO THE
APPLICATION, THE NETWORK, THE WEBSITE OR THE WEBSERVICE ABSENT USER INPUT 1040  IN RESPONSE TO A FIRST SHORT-RANGE WIRELESS COMMUNICATION MECHANISM
EMBODIED IN THE FIRST COMPUTING DEVICE ENGAGING IN SHORT-RANGE
WIRELESS COMMUNICATION WITH A SECOND WIRELESS COMMUNICATION
MECHANISM EMBODIED IN A SECOND COMPUTING DEVICE, AUTOMATICALLY
(*i*) RETRIEVE, FROM THE FIRST PASSCODE VAULT, A PASSCODE FROM AMONGST
THE PLURALITY OF FIRST PASSCODES THAT IS ASSOCIATED WITH THE SECOND
COMPUTING DEVICE, (ii) COMMUNICATE THE PASSCODE ASSOCIATED WITH THE
SECOND COMPUTING APPARATUS TO THE SECOND COMPUTING APPARATUS,
AND (*iii*) INPUT, AT THE SECOND COMPUTING APPARATUS, THE PASSCODE
ASSOCIATED WITH THE SECOND COMPUTING APPARATUS TO UNLOCK
THE SECOND COMPUTING APPARATUS ABSENT USER INPUT

FIG. 7

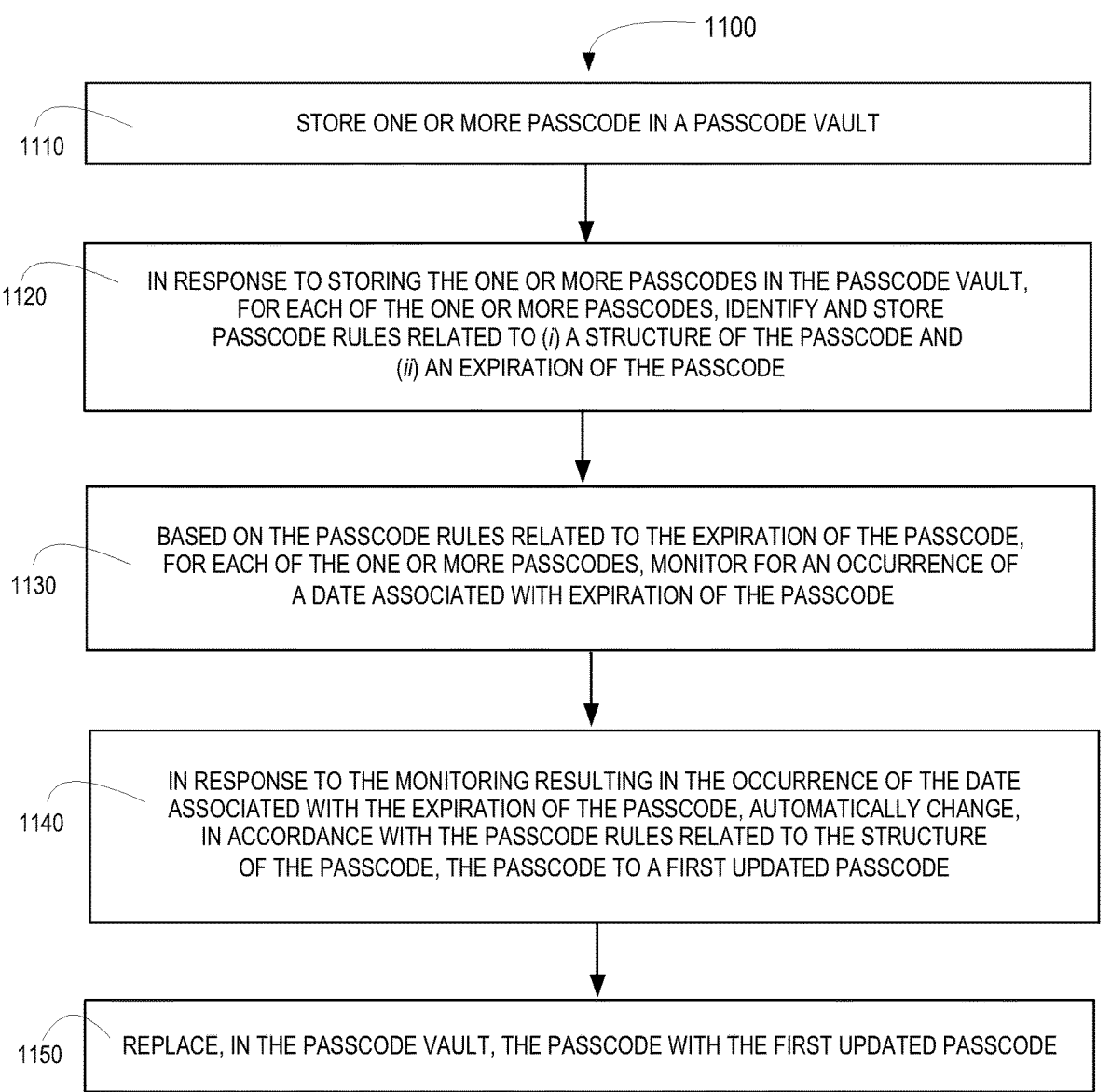

1100

1110  STORE ONE OR MORE PASSCODE IN A PASSCODE VAULT

1120  IN RESPONSE TO STORING THE ONE OR MORE PASSCODES IN THE PASSCODE VAULT, FOR EACH OF THE ONE OR MORE PASSCODES, IDENTIFY AND STORE PASSCODE RULES RELATED TO (*i*) A STRUCTURE OF THE PASSCODE AND (*ii*) AN EXPIRATION OF THE PASSCODE

1130  BASED ON THE PASSCODE RULES RELATED TO THE EXPIRATION OF THE PASSCODE, FOR EACH OF THE ONE OR MORE PASSCODES, MONITOR FOR AN OCCURRENCE OF A DATE ASSOCIATED WITH EXPIRATION OF THE PASSCODE

1140  IN RESPONSE TO THE MONITORING RESULTING IN THE OCCURRENCE OF THE DATE ASSOCIATED WITH THE EXPIRATION OF THE PASSCODE, AUTOMATICALLY CHANGE, IN ACCORDANCE WITH THE PASSCODE RULES RELATED TO THE STRUCTURE OF THE PASSCODE, THE PASSCODE TO A FIRST UPDATED PASSCODE

1150  REPLACE, IN THE PASSCODE VAULT, THE PASSCODE WITH THE FIRST UPDATED PASSCODE

FIG. 8

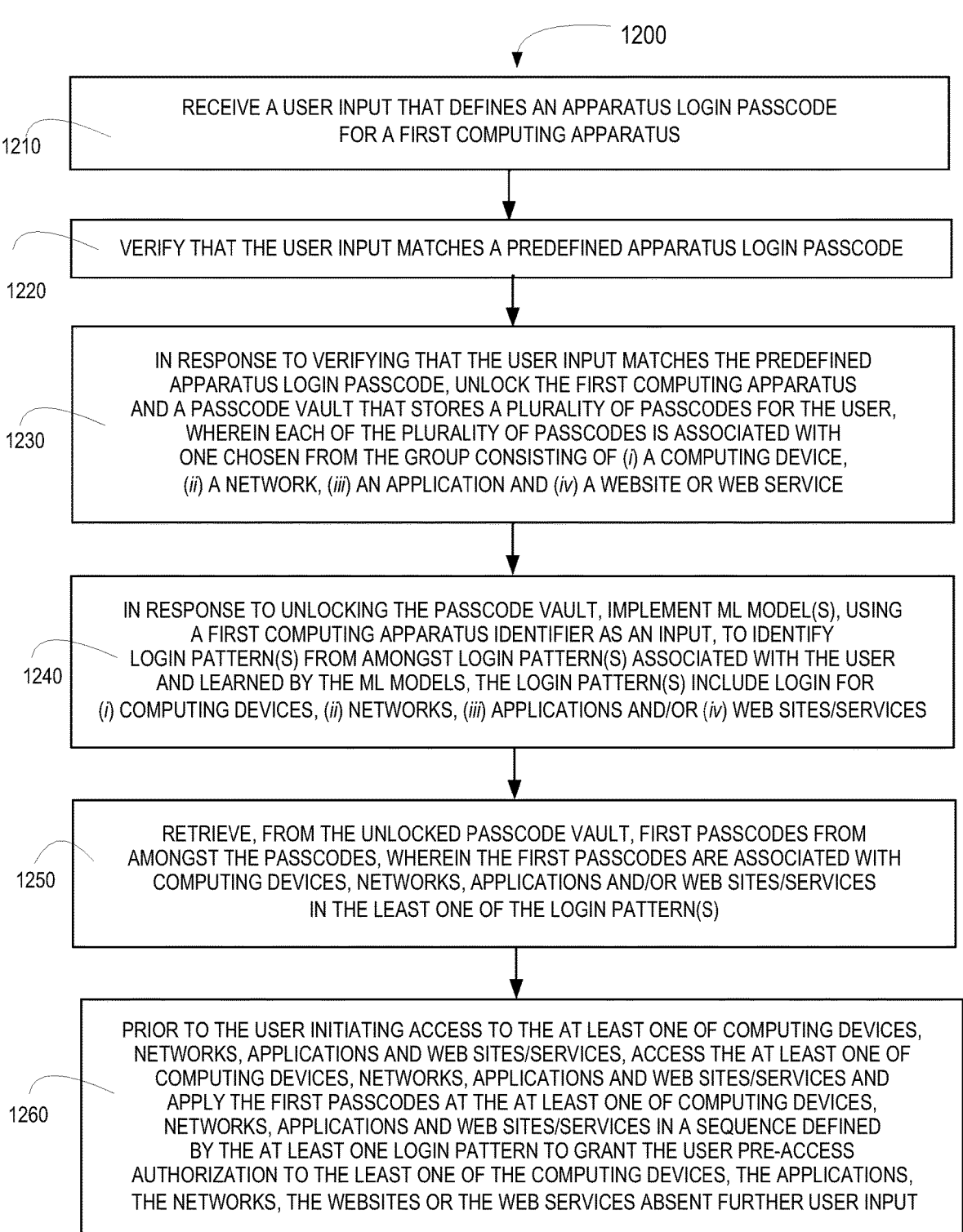

1200

1210     RECEIVE A USER INPUT THAT DEFINES AN APPARATUS LOGIN PASSCODE
FOR A FIRST COMPUTING APPARATUS

1220     VERIFY THAT THE USER INPUT MATCHES A PREDEFINED APPARATUS LOGIN PASSCODE

1230     IN RESPONSE TO VERIFYING THAT THE USER INPUT MATCHES THE PREDEFINED
APPARATUS LOGIN PASSCODE, UNLOCK THE FIRST COMPUTING APPARATUS
AND A PASSCODE VAULT THAT STORES A PLURALITY OF PASSCODES FOR THE USER,
WHEREIN EACH OF THE PLURALITY OF PASSCODES IS ASSOCIATED WITH
ONE CHOSEN FROM THE GROUP CONSISTING OF (*i*) A COMPUTING DEVICE,
(*ii*) A NETWORK, (*iii*) AN APPLICATION AND (*iv*) A WEBSITE OR WEB SERVICE 1240     IN RESPONSE TO UNLOCKING THE PASSCODE VAULT, IMPLEMENT ML MODEL(S), USING
A FIRST COMPUTING APPARATUS IDENTIFIER AS AN INPUT, TO IDENTIFY
LOGIN PATTERN(S) FROM AMONGST LOGIN PATTERN(S) ASSOCIATED WITH THE USER
AND LEARNED BY THE ML MODELS, THE LOGIN PATTERN(S) INCLUDE LOGIN FOR
(*i*) COMPUTING DEVICES, (*ii*) NETWORKS, (*iii*) APPLICATIONS AND/OR (*iv*) WEB SITES/SERVICES 1250     RETRIEVE, FROM THE UNLOCKED PASSCODE VAULT, FIRST PASSCODES FROM
AMONGST THE PASSCODES, WHEREIN THE FIRST PASSCODES ARE ASSOCIATED WITH
COMPUTING DEVICES, NETWORKS, APPLICATIONS AND/OR WEB SITES/SERVICES
IN THE LEAST ONE OF THE LOGIN PATTERN(S)

1260     PRIOR TO THE USER INITIATING ACCESS TO THE AT LEAST ONE OF COMPUTING DEVICES,
NETWORKS, APPLICATIONS AND WEB SITES/SERVICES, ACCESS THE AT LEAST ONE OF
COMPUTING DEVICES, NETWORKS, APPLICATIONS AND WEB SITES/SERVICES AND
APPLY THE FIRST PASSCODES AT THE AT LEAST ONE OF COMPUTING DEVICES,
NETWORKS, APPLICATIONS AND WEB SITES/SERVICES IN A SEQUENCE DEFINED
BY THE AT LEAST ONE LOGIN PATTERN TO GRANT THE USER PRE-ACCESS
AUTHORIZATION TO THE LEAST ONE OF THE COMPUTING DEVICES, THE APPLICATIONS,
THE NETWORKS, THE WEBSITES OR THE WEB SERVICES ABSENT FURTHER USER INPUT

FIG. 9

AUTOMATED MONITORING AND UPDATING OF PASSCODES FOR APPLICATIONS AND WEB SITES/SERVICES

FIELD OF THE INVENTION

The present invention is related generally to computing security and, more specifically, and automated monitoring and updating of passcodes for networks, applications, web sites/services and the like.

BACKGROUND

Historically, computer security has been addressed through implementation of user authentication in the form of login procedures, in which the user inputs credentials, such as username and/or passcode that are then verified as matching previously stored credentials. Such login procedures may the sole form of user authentication or may be part of a multi-factor authentication process in which the user is required to provide other verification factors, in addition to their passcode, for purposes of authentication.

Login procedures are not only required at the device level but may also be required to gain access to networks (e.g., intranet within an enterprise or the like), applications, web-sites, web services or the like. To be able to gain access to all of their requisite computing needs, users are required to possess multiple, if not hundreds of, different passcodes. As a result, trying to recall the passcodes and which passcodes are applicable to which devices, networks, applications, websites and the like becomes a daunting, if not impossible, task.

In addition, each device, network, application, website or the like have their own passcode rules which define the requirements of the passcode (e.g., minimum number of characters, case requirements, special character requirements and the like) as well as the life of the passcode (e.g., expiration period/date or the like). Typically, a user only becomes aware that a passcode has expired when a user attempts to login to the device, network, application, website or the like. Such notification of an expired passcode prompts the user to create a new passcode. In many instances, due to the user's unfamiliarity with the passcode rules, a user may have to make numerous attempts to create a new passcode in order to satisfy all of the passcode requirements. This can be an exasperating experience for the user, which only adds to delay in the user being able to access the device, network, application, website or the like.

Therefore, a need exists to develop systems, computerized methods, computer program products and the like that will address these needs. Specifically, desired systems and the like should eliminate the need for users to manually change passcodes in the event that a passcode has, or is about to, expired. In addition, the desired systems and the like should eliminate the need for user's to be knowledgeable or even aware of individual passcode rules, such as required structure of a passcode or the passcode expiration rules.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like that provide for passcode management. Specifically, the present invention provides for automated updating/changing of passcodes based on expiration or an impending expiration of the passcode, and, in some embodiments, security threats associated with the underlying network, application or web site/service.

A passcode is registered within a user's passcode vault, which triggers identification of passcode rules associated with the passcode. Identification of passcode rules may be performed by accessing security/passcode settings within a network or application or crawling associated web sites/services to identify the passcode rules. Passcode rules include, but are not limited to, rules related to the structure of the passcode (e.g., minimum character requirements, special character requirements, case requirements and the like) and rules related to the lifespan of a passcode (i.e., the duration/expiration period of a passcode). Once the passcodes rules have been identified they are stored and associated with the corresponding network, application web site/service or the like. Subsequently each passcode with associated passcode rules is monitored for the occurrence of a specified date associated with the expiration period (i.e., the date on which the passcode expires or a predetermined number of day(s) prior to the date on which the passcode expires. In response to the monitoring resulting in the occurrence of the specified date, the passcode is automatically updated/changed in accordance with the passcode rules related to the structure of the passcode and replaced in the passcode vault. In specific instances, such updates/changes to the passcode may occur without the knowledge of the user, while in other instances an alert notifying the user of the update/change may be communicated to the user immediately prior to or immediately after a passcode has been updated/changed.

In further embodiments of the invention, security monitoring of the networks, applications and/or web sites/services is implemented to identify security threats (or security threat data related to the networks, applications, web sites/services is received from a third-party). In response to the monitoring resulting in identification of a security threat (e.g., passcodes being compromised/exposed or the like), the passcode is automatically updated/changed in accordance with the passcode rules related to the structure of the passcode.

In still further embodiments of the invention, the networks, applications and/or web/sites are monitored on a continuous basis for changes to the passcode rules. In response to the monitoring resulting in changes to passcodes rules, the stored passcode rules are updated and subsequent passcode changes occur in accordance with the updated passcode rules.

A system for passcode management defines first embodiments of the invention. The system includes a computing apparatus including a memory and one or more computing processor devices in communication with the memory. The system additionally includes a passcode vault stored in the memory and configured to store a plurality of passcodes. Each of the plurality of passcodes associated with (i) a computing apparatus, (ii) an application or (iii) a website or web service. In addition, the system includes a passcode management application that is stored in the memory and executable by at least one of the one or more computing processor devices. The passcode management application is configured, to, in response to storing a passcode in the passcode vault, identify and store passcode rules related to a structure of the passcode and an expiration of the passcode and, based on the passcode rules related to the expiration of the passcode, monitor for an occurrence of a date associated with expiration of the passcode. In response to the monitoring resulting in the occurrence of the date associated with the expiration of the passcode, the passcode management application is configured to automatically change, in accordance with the passcode rules related to the structure of the passcode, the passcode to a first updated passcode, and store/replace, in the passcode vault, the passcode with the first updated passcode.

In specific embodiments of the system, the passcode management application is further configured to identify the passcode rules related to the structure of the passcode and the expiration of the passcode by (i) accessing a corresponding computing apparatus or application or (ii) crawling a corresponding website to obtain the passcode rules.

In other specific embodiments of the system, the passcode rules related to the structure of the passcode include minimum passcode character length, special character requirements and character case requirements and wherein the passcode rules related to the expiration of the passcode include an expiration period.

In additional specific embodiments of the system, the passcode management application is further configured to monitor for the occurrence of the date associated with expiration of the passcode, such as, a first date coinciding with an end of the expiration period or a second date occurring a predetermined number of days prior to the end of the expiration period.

In still further specific embodiments, the system includes a security threat monitoring application that is stored in the memory, and executable by at least one of the one or more computing processor devices. The security threat monitoring application is configured to monitor at least one of computing devices, applications and websites have corresponding passcodes stored in the passcode vault for occurrences of security threats. In response to the monitoring resulting in an occurrence of a security threat, the security threat monitoring application is configured to invoke the passcode management application to automatically change, in accordance with the passcode rules related to the structure of the passcode, an existing passcode to a second updated passcode that is different than the existing passcode, and replace, in the passcode vault, the existing passcode with the second updated passcode.

Moreover, in additional specific embodiments the system includes a passcode rules monitoring application that is stored in the memory, and executable by at least one of the one or more computing processor devices. The passcode rules monitoring application is configured to monitor at least one of computing devices, applications and websites have corresponding passcodes stored in the passcode vault for changes to the passcode rules, and, in response to the monitoring resulting in changes to the passcode rules, replace the currently stored passcode rules with the updated passcode rules that reflect the changes, such that, subsequent changes to an existing passcode are conducted in accordance with the updated passcode rules.

Further, in specific embodiments of the system, the passcode management system is further configured to generate an alert, and initiate communication of the alert to the passcode holder, prior to or after a change in the passcode that notifies the user that a passcode change will occur or has occurred. In related embodiments of the system, the passcode management system is further configured to generate and initiate communication of the alert after a change in the passcode. The alert includes a hyperlink that provides the passcode holder access to the passcode.

A computer-implemented method for passcode management defines second embodiments of the invention. The method being executable by one or more computing processor devices. The method includes storing one or more passcode in a passcode vault, and, in response to storing the one or more passcodes in the passcode vault, for each of the one or more passcodes, identifying and storing passcode rules related to (i) a structure of the passcode and (ii) an expiration of the passcode. The method further includes, based on the passcode rules related to the expiration of the passcode, for each of the one or more passcodes, monitoring for an occurrence of a date associated with expiration of the passcode and, in response to the monitoring resulting in the occurrence of the date associated with the expiration of the passcode, automatically changing, in accordance with the passcode rules related to the structure of the passcode, the passcode to a first updated passcode, and replacing, in the passcode vault, the passcode with the first updated passcode.

In specific embodiments of the computer-implemented method, identifying the passcode rules further includes one of (i) accessing a corresponding computing apparatus or application to obtain the passcode rules or (ii) crawling a corresponding website to obtain the passcode rules.

In other specific embodiments of the computer-implemented method, the passcode rules related to the structure of the passcode include minimum passcode character length, special character requirements and character case requirements and wherein the passcode rules related to the expiration of the passcode include an expiration period.

In additional specific embodiments of the computer-implemented method, monitoring for the occurrence of the date associated with expiration of the passcode further includes monitoring for at least one a first date coinciding with an end of the expiration period or a second date that is a predetermined number of days prior to the end of the expiration period.

In still further specific embodiments, the computer-implemented method includes monitoring computing devices, applications and websites have corresponding passcodes stored in the passcode vault for occurrences of security threats, and, in response to the monitoring resulting in an occurrence of a security threat, automatically changing, in accordance with the passcode rules related to the structure of the passcode, an existing passcode to a second updated passcode that is different than the existing passcode, and replacing, in the passcode vault, the existing passcode with the second updated passcode.

Moreover, in additional specific embodiments, the computer-implemented method further includes monitoring computing devices, applications and websites have corresponding passcodes stored in the passcode vault for changes to the passcode rules, and, in response to the monitoring resulting in changes to the passcode rules, replacing the currently stored passcode rules with the updated passcode rules that reflect the changes, such that, subsequent changes to an existing passcode are conducted in accordance with the updated passcode rules.

A computer program product including a non-transitory computer-readable medium defines third embodiments of the invention. The computer-readable medium includes sets of codes for causing one or more computing devices to store one or more passcode in a passcode vault and, in response to storing the one or more passcodes in the passcode vault, for each of the one or more passcodes, identify and store passcode rules related to (i) a structure of the passcode and (ii) an expiration of the passcode. The sets of codes further cause the one or more computing devices to, based on the passcode rules related to the expiration of the passcode, for each of the one or more passcodes, monitor for an occurrence of a date associated with expiration of the passcode, and, in response to the monitoring resulting in the occurrence of the date associated with the expiration of the passcode, automatically change, in accordance with the passcode rules related to the structure of the passcode, the passcode to a first updated passcode, and replace, in the passcode vault, the passcode with the first updated passcode.

In specific embodiments of the computer program product, the set of codes for causing the one or more computing devices to identify the passcode rules further cause the one or more computing devices to (i) access corresponding computing apparatus or application to obtain the passcode rules or (ii) crawl a corresponding website to obtain the passcode rules.

In other specific embodiments of the computer program product, the passcode rules related to the structure of the passcode include minimum passcode character length, special character requirements and character case requirements and wherein the passcode rules related to the expiration of the passcode include an expiration period.

In still further specific embodiments of the computer program product, the set of codes for causing the one or more computing devices to monitor for the occurrence of the date associated with expiration of the passcode further causes the one or more computing devices to monitor for at least one a first date coinciding with an end of the expiration period or a second date that is a predetermined number of days prior to the end of the expiration period.

In additional specific embodiments of the computer program product, the sets of codes further include sets of codes for causing the one or more computing devices to monitor computing devices, applications and websites have corresponding passcodes stored in the passcode vault for occurrences of security threat, and, in response to the monitoring resulting in an occurrence of a security threat, automatically change, in accordance with the passcode rules related to the structure of the passcode, an existing passcode to a second updated passcode that is different than the existing passcode, and replace, in the passcode vault, the existing passcode with the second updated passcode.

Moreover, in additional embodiments of the computer program product, the sets of codes further comprise sets of codes for causing the one or more computing devices to monitor computing devices, applications and websites have corresponding passcodes stored in the passcode vault for changes to the passcode rules, and, in response to the monitoring resulting in changes to the passcode rules, replace the currently stored passcode rules with the updated passcode rules that reflect the changes, and conduct subsequent changes to an existing passcode in accordance with the updated passcode rules.

Thus, according to embodiments of the invention, which will be discussed in greater detail below, the present invention provides for automated updating/changing of passcodes based on expiration or an impending expiration of the passcode, and, in some embodiments, security threats associated with the underlying network, application or web site/service. In this regard, passcode rules for passcodes stored in the passcode vault are identified, including passcode structure rules and passcode expiration rules. Subsequently the expiration dates trigger automatic update/change of the passcodes in accordance with the passcode structure rules. Additionally, networks, applications and/or web sites/services associated with the passcodes may be monitored for security threats, which, when detected, trigger automatic update/change of the passcodes in accordance with the passcode structure rules. Such updating/changing of the passcodes may be transparent to the users or the users may receive notification alerts. In further embodiments of the networks, applications and/or web sites services are monitored for changes to their respective passcode rules, such that future automated passcode updates/changes may occur in accordance with the updated passcode rules.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
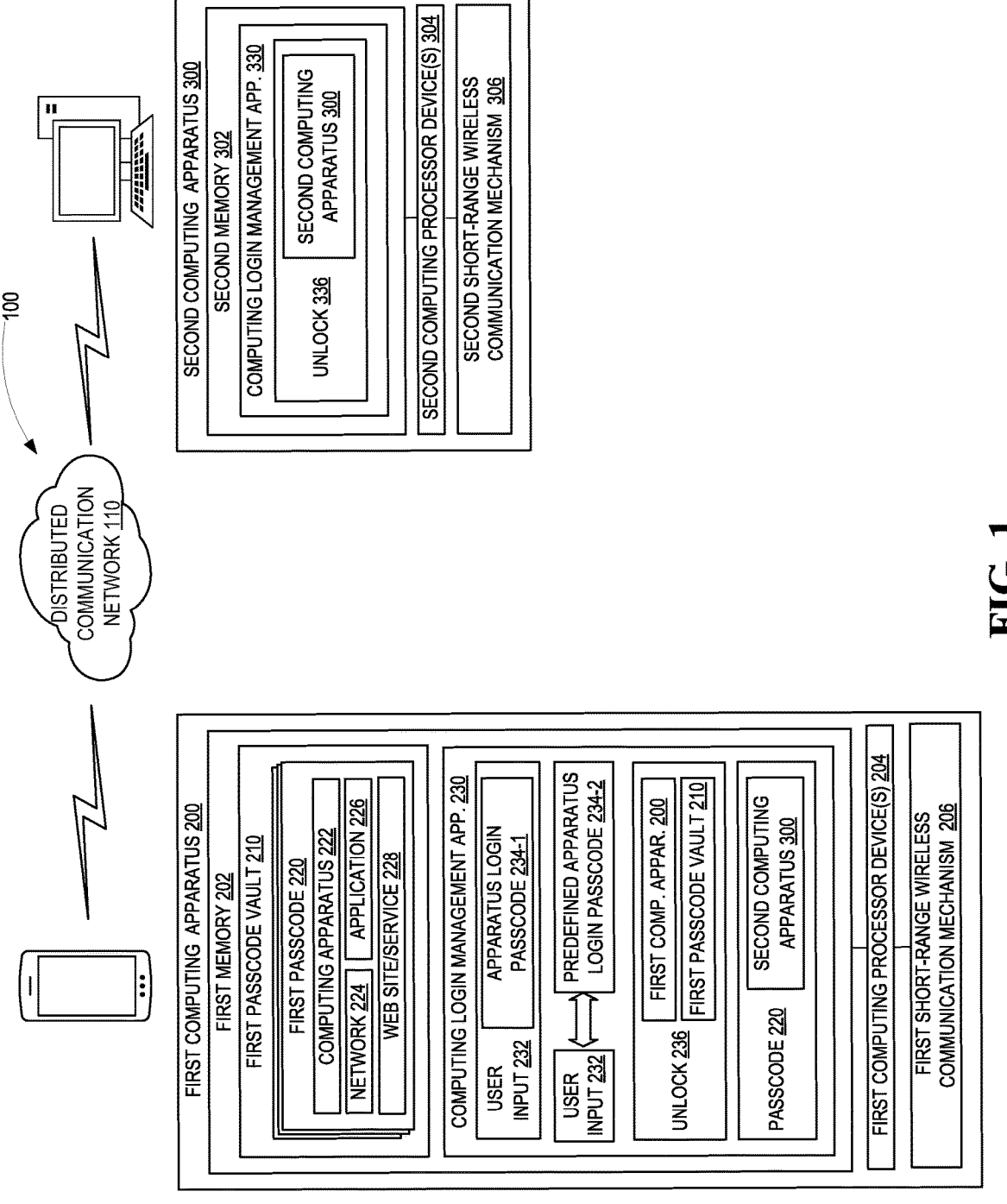
Figure 2:
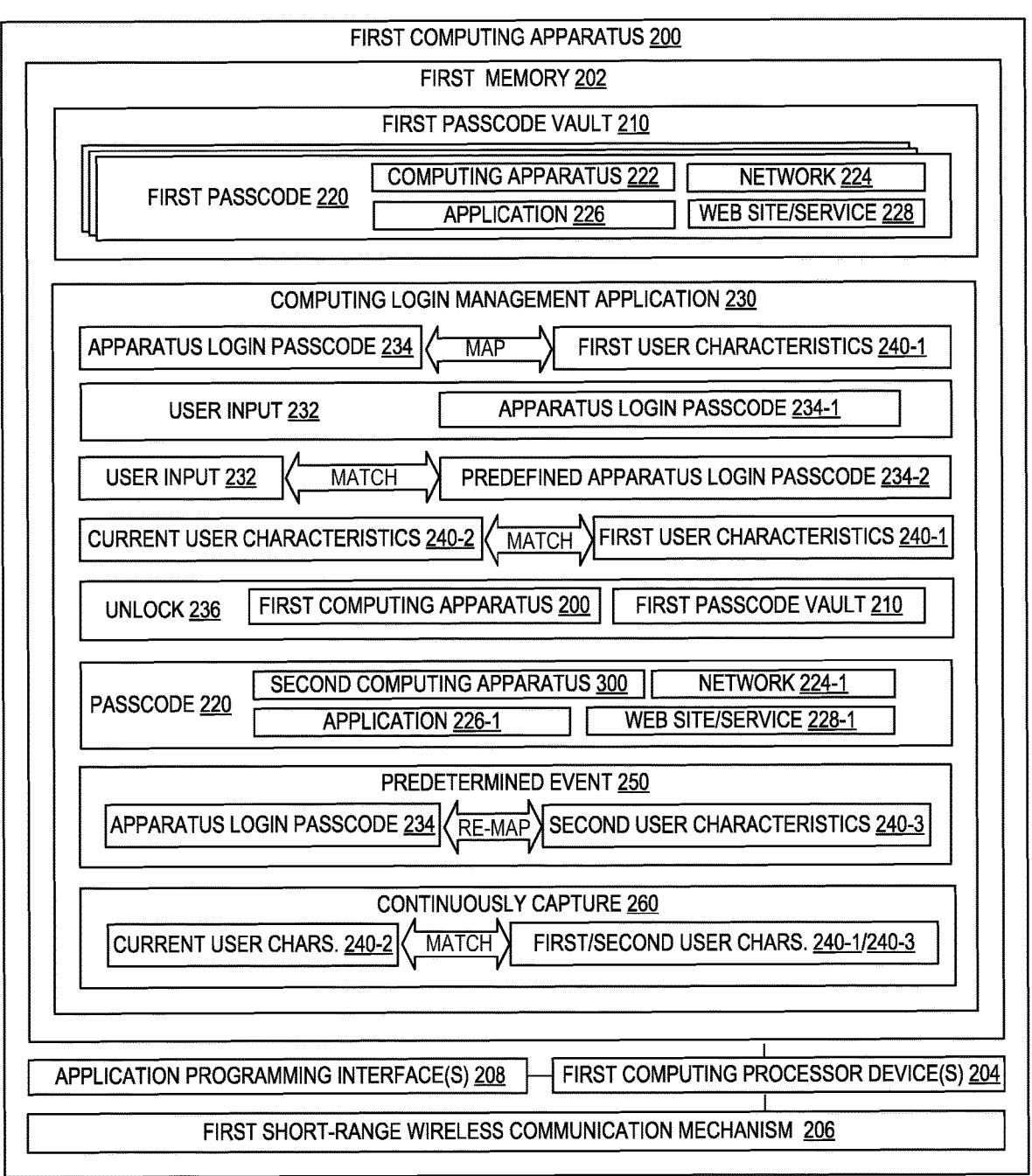
Figure 3:
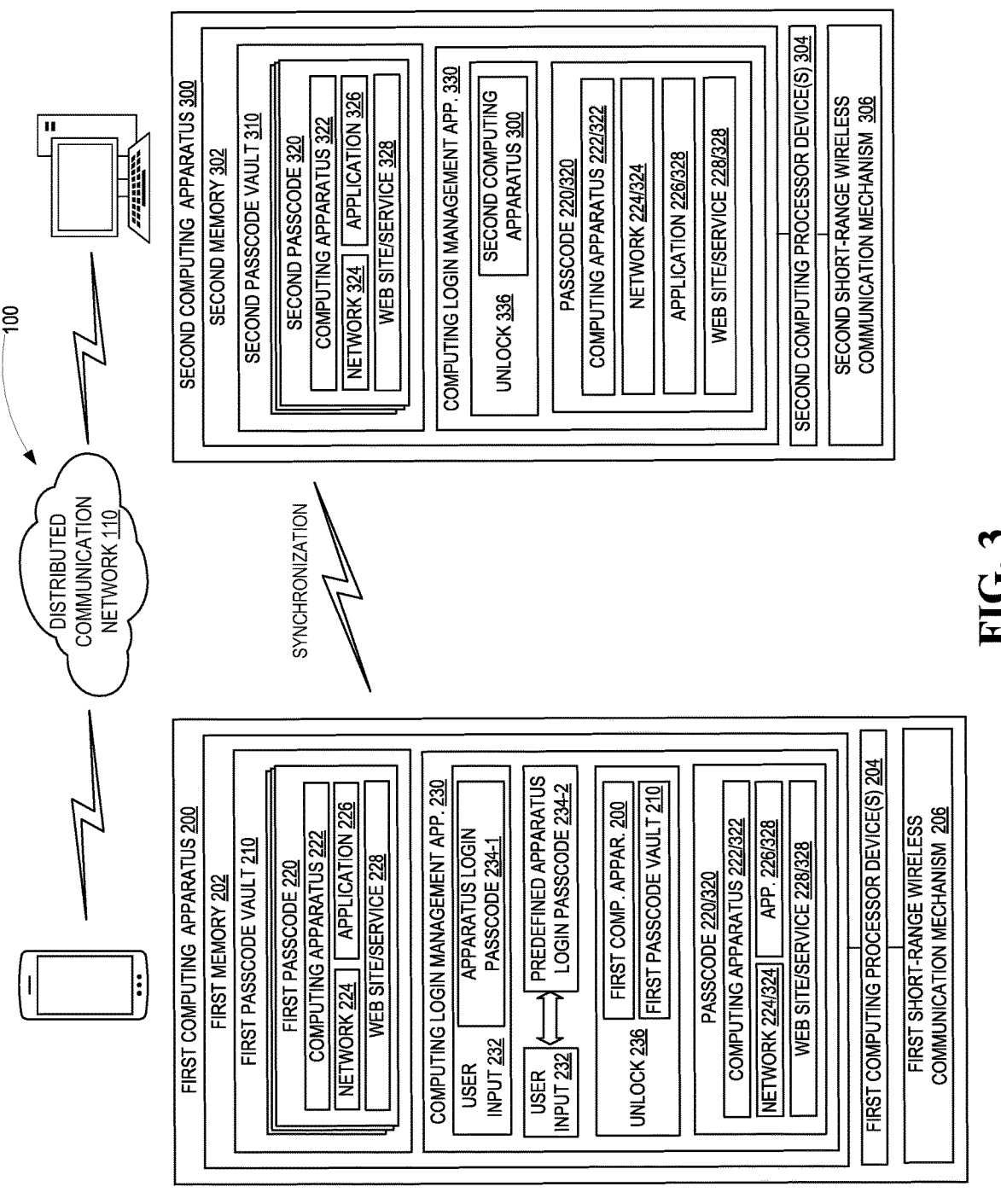
Figure 4:
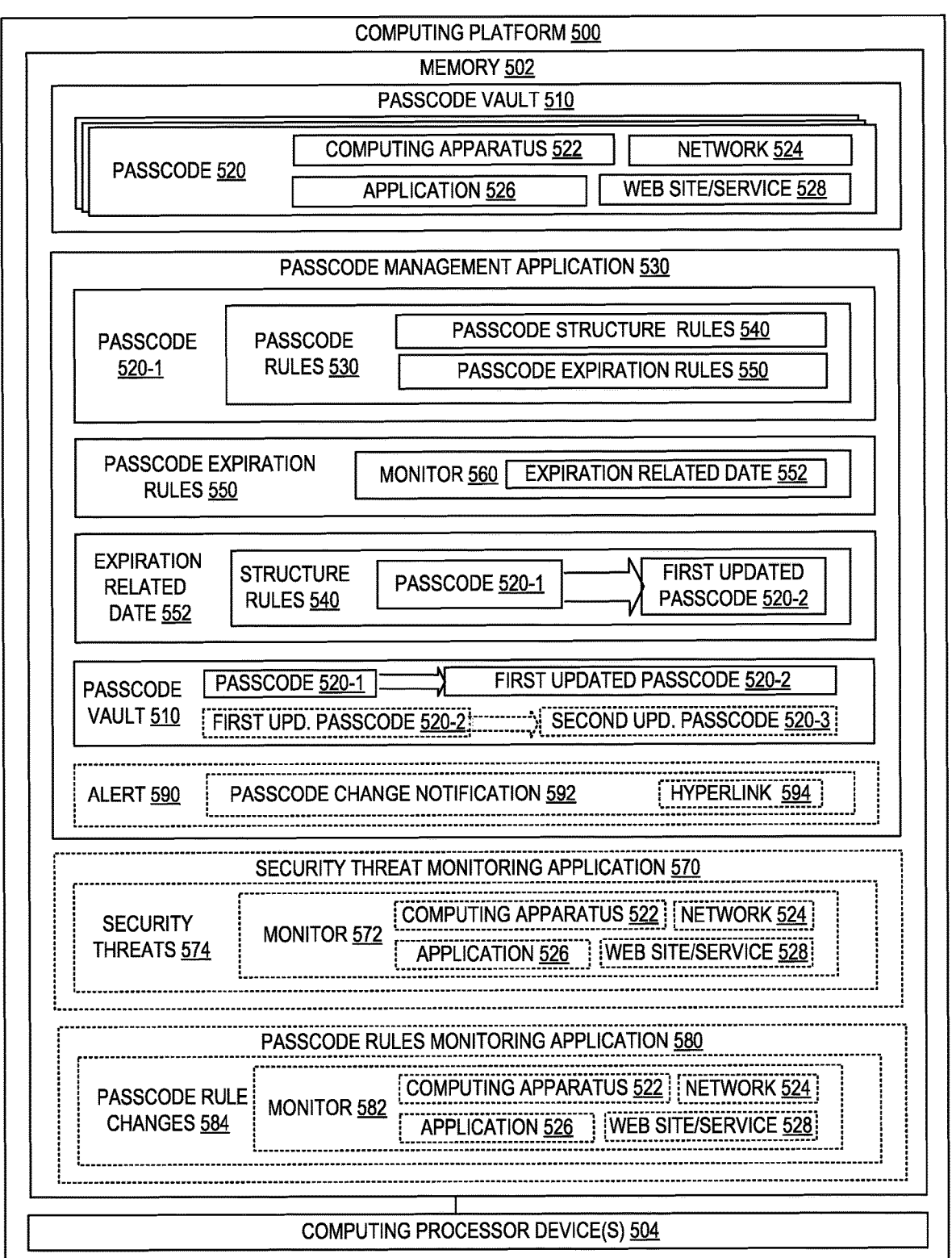
Figure 5:
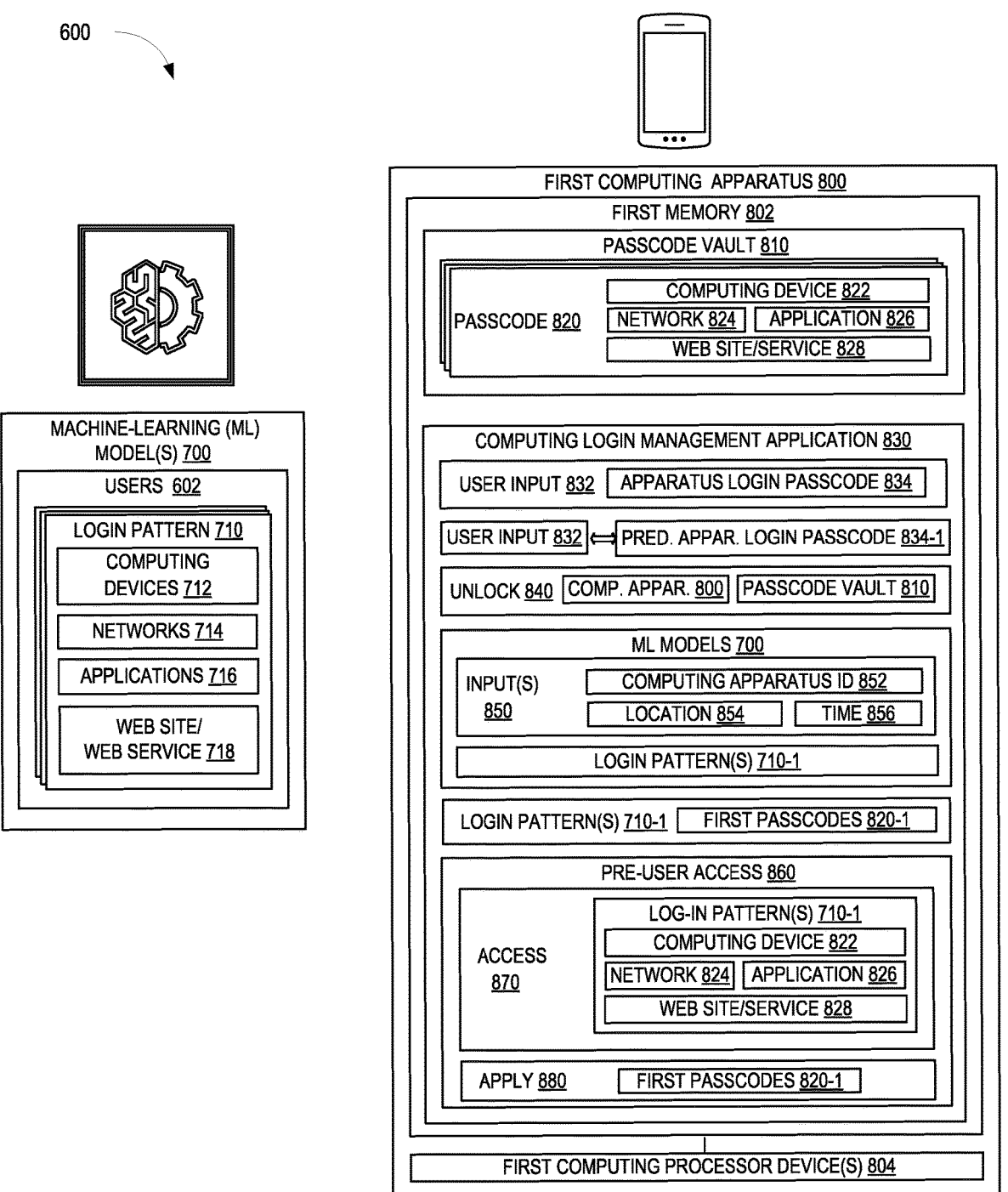
Figure 6:
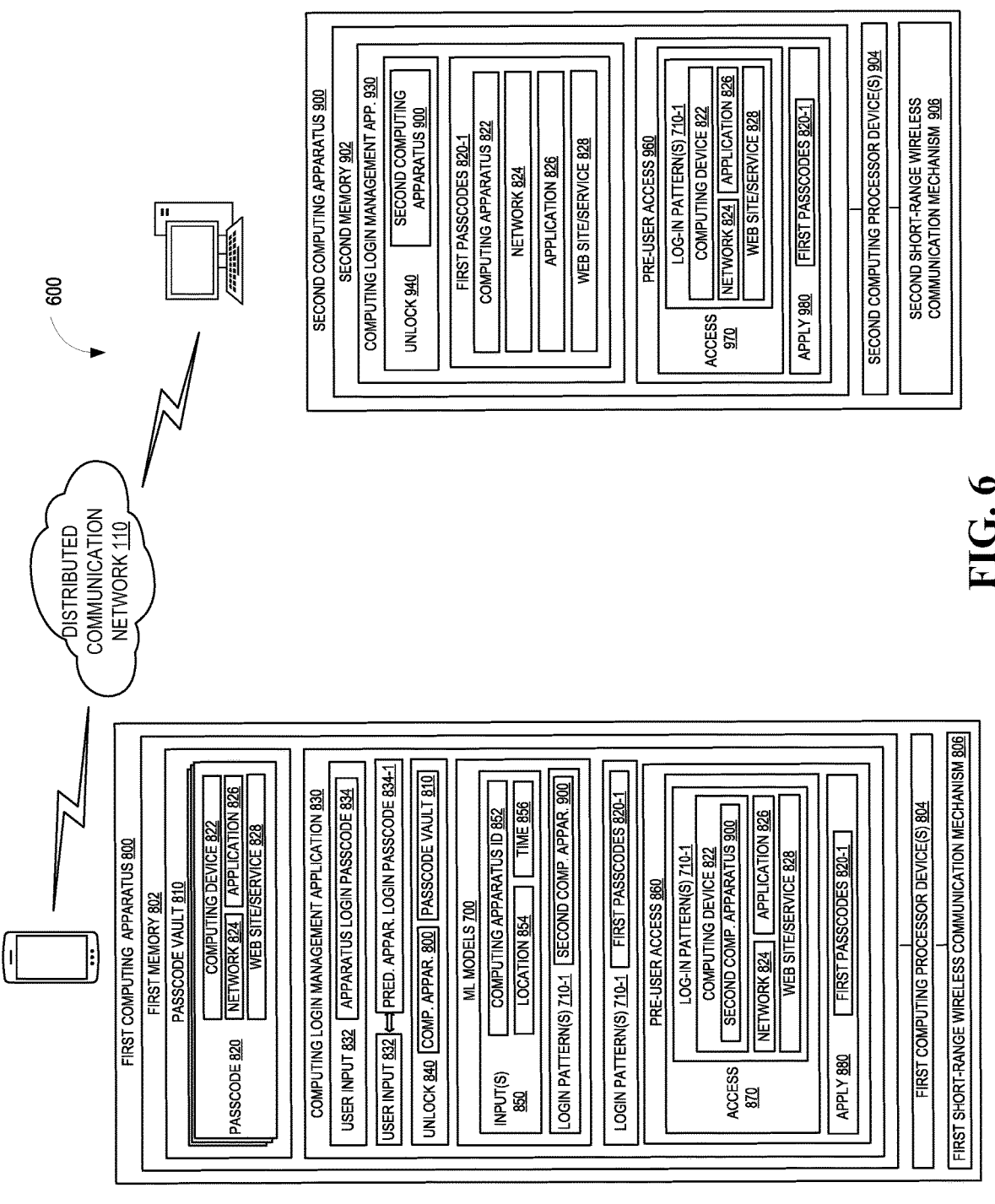

Having thus described embodiments of the disclosure in general terms, reference will now be made to the accompanying drawings, wherein:

FIG. 1 is a schematic/block diagram of a system for computing login management, in accordance with embodiments of the present invention;

FIG. 2 is a block diagram of a computing apparatus including a computing login management application, in accordance with embodiments of the present invention;

FIG. 3 is a schematic/block diagram of an addition system for computing login management, in accordance with embodiments of the present invention;

FIG. 4 is a block diagram of a computing platform for passcode management, in accordance with embodiments of the present invention;

FIG. 5 is a schematic/block diagram of a system for computing login management including machine-learning (ML) models trained to learn login patterns, in accordance with embodiments of the present invention;

FIG. 6 is a schematic/block diagram of an additional system for computing login management including machine-learning (ML) models trained to learn login patterns, in accordance with embodiments of the present invention;

FIG. 7 is a flow diagram of a method for computing login management, in accordance with embodiments of the present invention;

FIG. 8 is a flow diagram of a method for passcode management, in accordance with embodiments of the present invention; and FIG. 9 is a flow diagram of a method for computing login management implementing ML models trained to learn login patterns, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for passcode management. Specifically, the present invention provides for automated updating/changing of passcodes based on expiration or an impending expiration of the passcode, and, in some embodiments, security threats associated with the underlying network, application or web site/service.

A passcode is registered within a user's passcode vault, which triggers identification of passcode rules associated with the passcode. Identification of passcode rules may be performed by accessing security/passcode settings within a network or application or crawling associated web sites/services to identify the passcode rules. Passcode rules include, but are not limited to, rules related to the structure of the passcode (e.g., minimum character requirements, special character requirements, case requirements and the like) and rules related to the lifespan of a passcode (i.e., the duration/expiration period of a passcode). Once the passcodes rules have been identified they are stored and associated with the corresponding network, application web site/service or the like. Subsequently each passcode with associated passcode rules is monitored for the occurrence of a specified date associated with the expiration period (i.e., the date on which the passcode expires or a predetermined number of day(s) prior to the date on which the passcode expires. In response to the monitoring resulting in the occurrence of the specified date, the passcode is automatically updated/changed in accordance with the passcode rules related to the structure of the passcode and replaced in the passcode vault. In specific instances, such updates/changes to the passcode may occur without the knowledge of the user, while in other instances an alert notifying the user of the update/change may be communicated to the user immediately prior to or immediately after a passcode has been updated/changed.

In further embodiments of the invention, security monitoring of the networks, applications and/or web sites/services is implemented to identify security threats (or security threat data related to the networks, applications, web sites/services is received from a third-party). In response to the monitoring resulting in identification of a security threat (e.g., passcodes being compromised/exposed or the like), the passcode is automatically updated/changed in accordance with the passcode rules related to the structure of the passcode.

In still further embodiments of the invention, the networks, applications and/or web/sites are monitored on a continuous basis for changes to the passcode rules. In response to the monitoring resulting in changes to passcodes rules, the stored passcode rules are updated and subsequent passcode changes occur in accordance with the updated passcode rules.

Referring to FIG. 1, a schematic/block diagram is presented of a system 100 for computing login management, in accordance with embodiments of the invention. The system 110 may be implemented in conjunction with one or more distributed communication networks 110, such as the Internet, intranet(s), cellular network(s) and the like. System 100 includes a first computing apparatus 200, which, in the illustrated example of FIG. 1, is a mobile communication device, such as a smart telephone or the like. First computing apparatus 100 includes first memory 202, one or more first computing processor devices 204 in communication with first memory 202 and a first short-range wireless communication mechanism 206 (e.g., Near Field Communication, BLUETOOTH® (operating in the 2400 to 2483.5 MHz frequency range), ZIGBEE® (operating in 2400 MHz frequency) and the like) executable by at least one of the first computing processor device(s).

First memory 202 stores a first passcode vault 210 which stores a plurality of first passcodes 220. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the first passcodes 220 is associated with (i.e., provides the user access to) (i) a computing apparatus 222, (ii) a network 224, (iii) an application 226, (iv) a web site/service 228 or any other computer-based technology requiring a passcode for access purposes.

Additionally, first memory 202 stores a computing login management application 230 that is executable by at least one of the first computing processor devices 204. Computing login management application 230 is configured to receive a user input 232 that defines an apparatus login passcode 234-1 (i.e., a passcode that is configured to allow a user to access the mobile communication device (i.e., first computing apparatus 200)). In response to receiving user input 232, computing login management application 230 is configured to verify that the user input 232 matches a predefined apparatus login passcode 234-2 (i.e., a login passcode previously assigned to or chosen by the user and saved in first memory 202 and/or first passcode vault 210). In response to verifying that the user input 232 matches the predefined apparatus login passcode 234-2, computing login management application 230 is configured to unlock 236 (i) first computing apparatus 200 (i.e., provide the user access to the functionalities of first computing apparatus 200) and (ii) first passcode vault 210.

Unlocking of first passcode vault 210 provides for, in response to the user of first computing apparatus 200 launching an application 226 stored on or accessible via the first computing apparatus 200, or requesting access to a network 224 or a web site/service 228, retrieving a corresponding first passcode 220 from first passcode vault 210 and inputting the corresponding first passcode 220 at the application 226, network 224 or web site/service 228 to grant the user access to the application 226, network 224 or web site service 228 absent any further user input. In this regard, the login process for the application 226, network 224 or web site/service 228 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

System 100 additionally includes second computing apparatus 300, which, in the illustrated example of FIG. 2, is a personal computer (PC). Second computing apparatus 300 includes second memory 302, one or more second computing processor device(s) 304 in communication with second memory 302 and a second short-range wireless communication mechanism 306 (e.g., Near Field Communication, BLUETOOTH® (operating in the 2400 to 2483.5 MHz frequency range), ZIGBEE® (operating in 2400 MHz frequency) and the like) executable by at least one of the second computing processor device(s) 304. One of ordinary skill in the art will appreciate that first and second short range wireless communication mechanisms 206 and 306 are required to be of a same type or at least capable of communicating via a same short-range wireless communication technology.

In response to first and second short range wireless communication mechanisms 206 and 306 engaging in short-range wireless communication (i.e., first and second computing apparatus 200 and 300 coming within close proximity of one another), computing login management application 230 is configured to retrieve a first passcode 220 from first passcode vault 210 associated with second computing apparatus 300, communicate the associated first passcode 220 to the second computing apparatus 300 (typically via the backend using the distributed communication network 110), and input the associated first passcode 220 within computing login management application 330 of the second computing apparatus 300 to unlock 336 the second computing apparatus 300 absent any user input. In this regard, once the first and second computing apparatus 200 and 300 communicate via short-range wireless communication (i.e., during the handshake process), the first computing apparatus 200 becomes the proxy of the second computing apparatus in terms of computing login management. In specific embodiments of the invention, the user will have preconfigured settings within the computing login management application 230 identifying which secondary computing apparatus, such as second computing apparatus 300 are to be used for automated login. Similar to application, network, or web site/service login on the first computing apparatus 200, the login process for the second computing apparatus 300 occurs in the background without (i) requiring the user to enter their respective passcode or, in some embodiments, (ii) confirm the automated retrieval of their passcode from the first passcode vault 210 and/or automated input of their passcode at the second computing apparatus 300. As such, according to specific embodiments of the invention, the user may be unaware that the login/unlocking process is or has occurred at the second computing apparatus 300.

Referring to FIG. 2, a block diagram is presented of first computing apparatus 200 including computing login management application 230, in accordance with embodiments of the present invention. In addition to providing greater details of computing login management application 230, FIG. 2 highlights various alternate embodiments of the invention. First computing apparatus 200 may comprise one or multiple computing devices, such as a mobile device(s) (e.g., laptop, tablet, smart telephone, smart watch, smart glasses or the like). As previously discussed, first computing apparatus 200 includes first memory 302, which may comprise volatile and/or non-volatile memory, such as read-only memory (ROM) and/or random-access memory (RAM), EPROM, EEPROM, flash cards, or any memory common to computing platforms. Moreover, memory 202 may comprise cloud storage, such as provided by a cloud storage service and/or a cloud connection service.

Further, first computing apparatus 200 includes one or more first computing processing devices 204, which may be an application-specific integrated circuit ("ASIC"), or other chipset, logic circuit, or other data processing device. First computing processing device(s) 204 may execute one or more application programming interface (APIs) 208 that interface with any resident programs, such as computing login management application 230 or the like, stored in first memory 202 of first computing apparatus 200 and any external programs. First computing apparatus 200 may include various processing subsystems (not shown in FIG. 2) embodied in hardware, firmware, software, and combinations thereof, that enable the functionality of first computing apparatus 200 and the operability of first computing apparatus 200 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of first computing apparatus 200 may include any subsystem used in conjunction with computing login management application 230 and related tools, routines, sub-routines, applications, sub-applications, sub-modules thereof.

In specific embodiments of the present invention, first computing apparatus 200 additionally includes a communications module (not shown in FIG. 2) embodied in hardware, firmware, software, and combinations thereof, that enables electronic communications between components of first computing apparatus 200 and other networks and network devices. Thus, communication module may include the requisite hardware, firmware, software and/or combinations thereof for establishing and maintaining a network communication connection with one or more devices and/or networks.

As previously discussed in relation to FIG. 1, first memory 202 stores computing login management application 230 that is executable by at least one of the first computing processor devices 204. In specific embodiments of the system 100, computing login management application 230 is configured to map the apparatus login passcode 234 to previously captured/identified first user characteristics 240-1 (e.g., facial characteristics, such as facial image, portions of the facial image, facial movements, eye/iris pattern and the like), fingerprint(s), data entry (i.e., typing) patterns and/or rates and the like) and store the mapping in first memory 202, which may be first passcode vault 210. In specific embodiments of the invention, each character or segment (e.g., passcode as illustration/drawing) of the passcode is mapped to a different user characteristic.

As previously discussed in relation to FIG. 1, computing login management application 230 is configured to receive a user input 232 that defines an apparatus login passcode 234-1 and, in response, verify that the user input 232 matches a predefined apparatus login passcode 234-2. In additional specific embodiments of the system, in response to receiving the user input 232, computing login management application 230 is configured to capture or otherwise identify current user characteristics 240-2 and verify that the current user characteristics 240-2 match the first user characteristics 240-1 (i.e., the previously captured/identified and stored user characteristics) or match at least a portion of the first user characteristics. Thus, the verification of user characteristics 240 serves as an additional factor in a multi-factor user authentication process. In response to verifying that the user input 232 matches the predefined apparatus login passcode 234-2 and, in some embodiments, verifying that the current user characteristics 240-2 match the first user characteristics 240-1, computing login management application 230 is configured to unlock 236 (i) first computing apparatus 200 (i.e., provide the user access to the functionalities of first computing apparatus 200) and (ii) first passcode vault 210.

Unlocking of first passcode vault 210 provides for, in response to the user of first computing apparatus 200 launching an application 226 stored on or accessible via the first computing apparatus 200, or requesting access to a network 224 or a web site/service 228, retrieving a corresponding first passcode 220 from first passcode vault 210 and inputting the corresponding first passcode 220 at the application 226, network 224 or web site/service 228 to grant the user access to the application 226, network 224 or web site service 228 absent any further user input. In this regard, the login process for the application 226, network 224 or web site/service 228 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

In specific embodiments of the system, each of the first passcodes 220 stored in the first passcode vault 210 are mapped to user characteristics 240 (e.g., facial characteristics, such as facial image, portions of the facial image, facial movements, eye/iris pattern and the like), fingerprint(s), data entry (i.e., typing) patterns and/or rates and the like) and the mapping is stored in first passcode vault 210. In specific embodiments of the invention, each mapping may be different (i.e., each first passcode 220 is mapped to different user characteristics 240). In response to the user of first computing apparatus 200 launching an application 226 stored on or accessible via the first computing apparatus 200, or requesting access to a network 224 or a web site/service 228, computing login management application 230 is configured to capture or otherwise identify current user characteristics 240-2 and verify that the current user characteristics 240-2 match the user characteristics 240 mapped to the associated first passcode 220 (i.e., the previously captured/identified and stored user characteristics) or match at least a portion of the first user characteristics. In response to verifying that the current user characteristics 240-2 match the user characteristics 240 associated with the passcode, computing login management application 230 is configured to retrieve the corresponding first passcode 220 from first passcode vault 210 and inputting the corresponding first passcode 220 at the application 226, network 224 or web site/service 228 to grant the user access to the application 226, network 224 or web site service 228 absent any further user input.

In other specific embodiments of the system 100, in response to a predetermined event 250, computing login management application 230 is configured to re-map the apparatus login passcode 234 to second user characteristics 240-3 which are different that the set of the first user characteristics 240-1. In other specific embodiments of the system, in which the first passcodes 220 stored in the first passcode vault 210 are mapped to user characteristics 240, the occurrence of the predetermined event 250 may prompt computing login management application 230 to re-map of the first passcodes 220 to different user characteristics 240. In specific embodiments of the invention, the predetermined event 250 may be a specific date coinciding with expiration of the mapping or a determination that a security event that comprises the first computing apparatus 200 has or is occurring. In other instances, re-mapping of passcodes to user characteristics may occur periodically on a random schedule or on-demand (at the bequest of the user or the apparatus manufacturer).

In further specific embodiments of the invention, computing login management application 230 is configured to continuously capture 260 current user characteristics 240-2 during the user's first computing apparatus 200 login session and verify that the current user characteristics 240-2 match the first user characteristics 240-1 (or if re-mapped any subsequent user characteristics). In response to verifying that the current user characteristics match the first user characteristics 240-1, the first passcode vault 210 remains in an unlocked state (i.e., automatic retrieval and input of passcodes can occur). However, in the event that one or all of the current user characteristics do not match the first user characteristics or the user characteristics of record, the first passcode vault 210 may be locked (i.e., requiring the user to input their passcodes at applications, networks, web sites/services or the like) and, in some instances, the first computing apparatus 200 may be locked or otherwise disabled.

Referring to FIG. 3, additional features of the computing login management system 100 are shown, in accordance with additional embodiments of the invention. In response to first and second short-range wireless communication engaging in the short-range wireless communication and in response to the user of second computing apparatus 300 launching an application 226 stored on or accessible via the second computing apparatus 300, or requesting access to a network 224 or a web site/service 228 at the second computing apparatus 300, computing login management application 230 is configured to retrieve a corresponding first passcode 220 associated with the application 226, network 224 or web site/service 228 from first passcode vault 210, communicate the first passcode 220 to the second computing apparatus 300 (typically via the distributed communication network 110) and input the associated first passcode 220 at the application 226, network 224 or web site/service 228 to grant the user access to the application 226, network 224 or web site service 228 at/on the second computing apparatus 300 absent any further user input. In this regard, the login process for the application 226, network 224 or web site/service 228 at the second computing apparatus 300 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

In additional embodiments of the system 100, second memory 302 of second computing apparatus 300 stores a second passcode vault 310 which stores a plurality of second passcodes 320. Each of the second passcodes 220 is associated with (i.e., provides the user access to) (i) a computing apparatus 322, (ii) a network 324, (iii) an application 326, (iv) a web site/service 328 or any other computer-based technology requiring a passcode for access purposes. Typically, some, if not most, of the computing apparatus 322, networks 324, applications 326 and/or web sites/services 328 having second passcodes 320 stored in the second passcode vault 310 will be the same as the computing apparatus 222, networks 224, applications 226 and/or web sites/services 228 having first passcodes 220 stored in the first passcode vault 210. In specific embodiments of the system 100, in response to the first and second short-range wireless communication mechanisms 206 and 306 engaging in short-range wireless communication, synchronization occurs between the first passcode vault 220 and the second passcode vault 310. Synchronization provides for the first passcode vault 220 and the second passcode vault 310 to store the same passcodes (i.e., store passcodes for the same computing apparatus 222, networks 224, applications 226 and/or web sites/services 228. As a result of synchronization, the second computing apparatus 300 need not rely on the first computing apparatus to retrieve and communicate first passcodes from the first passcode vault 210 when launching an application 226 or accessing a network 224 or web site/service 228 on the second computing apparatus 300. Rather, the second computing apparatus 300 can rely on retrieving and inputting second passcodes from the second passcode vault 310 which has been previously synchronized with the first passcode vault 210.

Referring to FIG. 4, a block diagram is presented of a computing platform 500 including a passcode management application 530, in accordance with embodiments of the present invention. The passcode management application 530 may be implemented in conjunction with embodiments of the invention discussed in relation to FIGS. 1-3 or the passcode management application 530 may constitute stand-alone embodiments of the invention. Computing platform 500 may comprise one or more computing devices, such as mobile computing devices, (e.g., laptop, tablet, smart telephone, smart watch, smart glasses or the like), PC(s), server(s) or the like. Computing platform 500 includes a memory 502 and one or more computing processor devices 504 in communication with the memory 502. Memory 502 stores a passcode vault 510 which stores a plurality of passcodes 520. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the passcodes 520 is associated with (i.e., provides the user access to) (i) a computing apparatus 522, (ii) a network 524, (iii) an application 526, (iv) a web site/service 528 or any other computer-based technology requiring a passcode for access purposes.

Memory 502 additionally stores passcode management application 530 that is executable by at least one of the computing processor device(s) 504. In response to storing, in the passcode vault 510, a passcode 520-1 associated with a computing apparatus 522, network 524, application 526 or web site/service 528, passcode management application 530 is configured to identify and store passcode rules 530 associated with the passcode 520-1. Passcode rules 530 include, but are not limited to, (i) passcode structure rules 540 that define structure requirements, such as minimum/maximum character length, character type requirements (e.g., number character requirements, special character requirements and the like), character case requirements and the like, and (ii) passcode expiration rules 550 that define a time period during which the passcode is valid/active (e.g., a time period until expiration or the like). In specific embodiments of the system, the passcode rules are identified by accessing the application or crawling the website or network to identify the passcode rules associated with passcode 520-1.

Based on the passcode expiration rules 540, the passcode 520-1 is monitored 560 for an occurrence of an expiration-related date 552, which may the actual date on which the passcode expires or one or more days prior to the date on which the passcode expires. In response to the monitoring resulting in the occurrence of the expiration-related date 552, the passcode 520-1 is automatically changed, in accordance with the passcode structure rules 540 to a first updated passcode 520-2 and the passcode 520-1 stored in the passcode vault 510 is replaced with the first update passcode.

In specific optional embodiments of the invention, memory 502 of computing platform 500 stores a security threat monitoring application 720 that is executable by at least one of the computing device processors 504. Security threat monitoring application 720 is configured to monitor or receive results of third-part monitoring of computing apparatus 522, networks 524, applications 526 or web site/service 528 having corresponding passcodes 520 stored in the passcode vault 510 for occurrences of security threats (e.g., breaches that compromise passcodes or the like). In response to the monitoring resulting in the occurrence of a security threat, security threat monitoring application 570 notifies passcode management application 530, which responds by automatically changing, in accordance with the passcode structure rules 540, the existing passcode (i.e., first updated passcode 520-2) to a second updated passcode 520-3 and replacing the first updated passcode 520-2 stored in the passcode vault 510 with the second update passcode 520-3.

In specific optional embodiments of the invention, memory 502 of computing platform 500 stores a passcode rules monitoring application 580 that is executable by at least one of the computing device processors 504. Passcode rules monitoring application 720 is configured to monitor or receive results of third-part monitoring of computing apparatus 522, networks 524, applications 526 or web site/service 528 having corresponding passcodes 520 stored in the passcode vault 510 for changes in passcode rules. In response to the monitoring resulting in changes to passcode rules, the currently stored passcode rules are replaced with updated passcode rules that reflect the changes and subsequent changes to passcodes are conducted with the updated passcode rules.

Moreover, in additional optional embodiments of the invention, passcode management application is further configured to generate, and initiate communication of to the user, an alert 590 that is configured as a password change notification 592. In specific embodiments of the invention, alert 590 is configured to include a hyperlink 594 that, when activated, provides access to the updated/changed passcode.

Referring to FIG. 5, a block diagram is presented of a system 600 for computing login management, in accordance with embodiments of the present invention. The computing login management system 600 may be implemented in conjunction with embodiments of the invention discussed in relation to FIGS. 1-4 or the computing login management system 600 may constitute stand-alone embodiments of the invention. The system 600 includes one or more machine-learning (ML) models 700 that are trained to learn login patterns 710 for users 602. The login patterns define a user's typical series of computing logins that they perform dependent upon their location or time of day/week or the like. For example, a login pattern may be associated with a user's place of employment at the start of weekday (e.g., Monday-Friday). The logins that are included within a login pattern 710 may include, but are not limited to, one or more of (i)

computing devices/apparatus, (ii) networks, (iii) applications, (iv) web sites/services and the like.

In addition, system 600 includes first computing apparatus 800, which as shown in the illustrated example of FIG. 5 may be a mobile device, such as a smart telephone or the like. First computing apparatus 800 includes first memory 802 and one or more computing processor devices 804 in communication with memory 802. First memory 810 stores a passcode vault 810 which stores a plurality of passcodes 820. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the passcodes 820 is associated with (i.e., provides the user access to) (i) a computing device 822, (ii) a network 824, (iii) an application 826, (iv) a web site/service 828 or any other computer-based technology requiring a passcode for access purposes.

Additionally, first memory 802 stores a computing login management application 830 that is executable by at least one of the first computing processor devices 804. Computing login management application 830 is configured to receive a user input 832 that defines an apparatus login passcode 834 (i.e., a passcode that is configured to allow a user to access the mobile communication device (i.e., first computing apparatus 800)). In response to receiving user input 832, computing login management application 830 is configured to verify that the user input 832 matches a predefined apparatus login passcode 834-1 (i.e., a login passcode previously assigned to or chosen by the user and saved in first memory 802, such as passcode vault 810). In response to verifying that the user input 832 matches the predefined apparatus login passcode 834-1, computing login management application 230 is configured to unlock 840 (*i*) first computing apparatus 800 (i.e., provide the user access to the functionalities of first computing apparatus 800) and (ii) passcode vault 810.

Unlocking of first passcode vault 810 provides for, in response to the user of first computing apparatus 800 launching an application 826 stored on or accessible via the first computing apparatus 800, or requesting access to a network 824 or a web site/service 828, retrieving a corresponding passcode 820 from passcode vault 210 and inputting the corresponding passcode 820 at the application 826, network 824 or web site/service 828 to grant the user access to the application 826, network 824 or web site service 828 absent any further user input. In this regard, the login process for the application 826, network 824 or web site/service 928 occurs in the background without (i) requiring the user to enter their respective passcode or, in some embodiments, (ii) confirm the automated retrieval of their passcode 820 from the passcode vault 810 and/or automated input of their passcode 810 at the application 826, network 824 or web site/service 828. As such, according to specific embodiments of the invention, the user may be unaware that the login process is or has occurred.

In response to unlocking 840 first computing apparatus 800 and passcode vault 810, computing login management application 830 is further configured to execute at least one of the ML model(s) 700, using at least a first computing apparatus identifier (ID) 852 as an input 850, to identity at least one login pattern 710-1 from amongst the previously learned login patterns 710. In optional embodiments of the system 600, the first computing apparatus includes a location-determining mechanism (e.g., Global Positioning System (GPS) mechanism or the like) configured to determine a physical location of the first computing apparatus 800. In such embodiments of the system 600, the computing login management application is further configured to implement the location-determining mechanism to determine the current location 854 of the first computing apparatus 800 and the inputs 850 to the ML model(s) 700 include the current location 854 of the first computing apparatus 800. In other optional embodiments of the system 600, the first computing apparatus includes a time-measurement mechanism (e.g., a clock or the like) configured to determine a time. In such embodiments of the system 600, the computing login management application is further configured to implement the time-measurement mechanism to determine the current time 856 and the inputs 850 to the ML model(s) 700 include the current time 856.

In response to identifying login pattern(s), computing login management application 830 is further configured to retrieve a corresponding first passcode 820-1 from passcode vault 810. The first passcodes 820-1 being associated with computing devices, 822, networks 824, applications 826 and/or web sites/services 828 in the login pattern(s) 710-1. Moreover, computing login management application 830 is further configured to, in advance of the user initiating access to the computing device(s) 822, network(s) 824, application(s) 836 and/or web site(s)/service(s) 828 (i.e., pre-user access 860), access 870 the computing device(s) 822, network(s) 824, application(s) 836 and/or web site(s)/service(s) 828 in the login pattern(s) 710-1 and apply/enter 880 the first passcodes 820-1 in the sequence/order defined by login pattern(s) 710-1. Thus, in effect, the user is pre-authorized (i.e., already logged-in to) the computing device(s), network(s), application(s) and/or web site(s)/service(s) in the login pattern prior to the user interfacing with or initiating access at the computing device(s), network(s), application(s) and/or web site(s)/service(s). It should be noted that such pre-authorized access occurs without user input and, in some instances, without user knowledge of the automated login process.

Referring to FIG. 6, a block diagram is presented of an alternate system 600 for computing login management, in accordance with embodiments of the present invention. The computing login management system 600 may be implemented in conjunction with embodiments of the invention discussed in relation to FIGS. 1-5 or the computing login management system 600 may constitute stand-alone embodiments of the invention. While the system 600 described in relation FIG. 6 includes the ML learning models 700 shown and discussed in relation to FIG. 5, for the sake of conciseness and brevity such ML models are not shown or discussed in relation to FIG. 6. Further, first computing apparatus 800 includes all aspects discussed in relation to FIG. 5 and, for the sake of brevity, such aspects will not be discussed herein in relation to FIG. 6. First computing apparatus 800 additionally includes first a first short-range wireless communication mechanism 206 (e.g., Near Field Communication, BLUETOOTH® (operating in the 2400 to 2483.5 MHz frequency range), ZIGBEE® (operating in 2400 MHz frequency) and the like) executable by at least one of the first computing processor device(s) 804.

In addition, system 600 includes a second computing apparatus 900 including second memory 902, one or more second computing processor device(s) 904 in communication with second memory 902 and a second short-range wireless communication mechanism 906 (e.g., Near Field Communication, BLUETOOTH® (operating in the 2400 to 2483.5 MHz frequency range), ZIGBEE® (operating in 2400 MHz frequency) and the like) executable by at least one of the second computing processor device(s) 904. One of ordinary skill in the art will appreciate that first and second short range wireless communication mechanisms 806 and 906 are required to be of a same type or at least capable of communicating via a same short-range wireless communication technology.

In response to first and second short range wireless communication mechanisms 806 and 906 engaging in short-range wireless communication (i.e., first and second computing apparatus 800 and 900 coming within close proximity of one another), computing login management application 830 is configured to (i) retrieve a first passcode 820-1 from first passcode vault 810 that is associated with second computing apparatus 900 and included in one of the login pattern(s) 710-1, (ii) communicate the associated first passcode 820-1 to the second computing apparatus 900 (typically via the backend using the distributed communication network 110), and (iii) input the associated first passcode 820-1 within computing login management application 930 of the second computing apparatus 900 to unlock 940 the second computing apparatus 900 absent any user input. In this regard, once the first and second computing apparatus 800 and 900 communicate via short-range wireless communication (i.e., during the handshake process), the first computing apparatus 800 becomes the proxy of the second computing apparatus 900 in terms of computing login management. In specific embodiments of the invention, the user will have preconfigured settings within one or more of the computing login management applications 830 and/or 930 identifying which secondary computing apparatus, such as second computing apparatus 900 are to be used for automated login. Similar to application 826, network 824, or web site/service 828 login on the first computing apparatus 800, the login process for the second computing apparatus 900 occurs in the background without (i) requiring the user to enter their respective passcode or, in some embodiments, (ii) confirm the automated retrieval of their passcode from the first passcode vault 810 and/or automated input of their passcode at the second computing apparatus 900. As such, according to specific embodiments of the invention, the user may be unaware that the login/unlocking process is or has occurred at the second computing apparatus 900.

In the event that the login pattern(s) include computing apparatus 822, network(s), applications 826 and/or web sites/services 828 that are accessed on or via the second computing apparatus 900, once the second computing apparatus 940 has been unlocked 940, computing login management application 830 is further configured to retrieve, from the passcode vault 810, corresponding first passcode(s) 820-1 associated with computing devices, 822, networks 824, applications 826 and/or web sites/services 828 in the login pattern(s) 710-1 that are being accessed on or via the second computing apparatus 900 and communicate the first passcodes 820-1 to the second computing apparatus 800 (typically via the backend distributed communication network 110). Moreover, computing login management application 830 is further configured to, in advance of the user initiating access to the computing device(s) 822, network(s) 824, application(s) 836 and/or web site(s)/service(s) 828 on the second computing apparatus 900 (i.e., pre-user access 960), access 970 the computing device(s) 822, network(s) 824, application(s) 836 and/or web site(s)/service(s) 828 in the login pattern(s) 710-1 and apply/enter 980 the first passcodes 820-1 in the sequence/order defined by login pattern(s) 710-1. Thus, in effect, the user is pre-authorized (i.e., already logged-in to) the computing device(s), network(s), application(s) and/or web site(s)/service(s) in the login pattern on the second computing apparatus 900 prior to the user interfacing with or initiating access at the computing device(s), network(s), application(s) and/or web site(s)/service(s). It should be noted that such pre-authorized access occurs without user input and, in some instances, without user knowledge of the automated login process.

Referring to FIG. 7, a flow diagram is depicted of a method 1000 for computing login management, in accordance with embodiments of the present invention. At Event 1010, a user input is received, at a first computing apparatus (e.g., mobile device) from a user that defines an apparatus login passcode and, at Event 1020, a verification is performed to determine whether the user input matches a predefined apparatus login passcode. In response to the verification determining that the user input matches the predefined apparatus login passcode, at Event 1030, the (i) first computing apparatus and (ii) a first passcode vault stored on or accessible to the first computing apparatus are unlocked. The first passcode vault stores a plurality of first passcodes, each first passcode is associated with a (i) a computing apparatus, (ii) a network, (iii) an application, or (iv) a web site/service.

Unlocking the first passcode vault provides for automatically (i) retrieving a corresponding first passcode from the first passcode vault when the user requests access to an application, a network, or a web site/service having the corresponding first passcode stored in the first passcode vault and (ii) inputting the corresponding first passcode at the application, network, web site/service to grant the user access to the application, network or web site/service absent user input. In other words, the login process occurs in the background without user input and, in some instances, without user knowledge.

In response to a first short-range wireless communication mechanism embodied in the first computing apparatus engaging in short-range wireless communication with a second short-range wireless communication mechanism embodied in a second computing apparatus, at Event 1040, the first passcode corresponding to the second computing apparatus is retrieved from the first passcode vault, communicated to the second computing apparatus (typically via a backend network, such as the Internet and or intranet(s)) and inputted at the second computing apparatus to unlock the second computing apparatus absent user input. In this regard, the method provides for the handshake short-wireless communication between the first and second computing apparatus to trigger the first computing apparatus to become proxy for the second computing apparatus for purposes of login management. In this regard, the handshake short-wireless communication between the first and second computing apparatus triggers automatic user login at the second computing apparatus absent user input.

Referring to FIG. 8, a flow diagram is depicted of a method 1100 for passcode management, in accordance with embodiments of the present invention. At Event 1110, one or more passcodes are stored in a passcode vault of a computing apparatus. In response to storing the passcodes in the passcode vault, at Event 1120, passcode rules are identified for each of the passcodes and are stored in, or otherwise accessible to the computing apparatus (e.g., the passcode rules are stored in the passcode vault). The passcode rules include, but are not limited to, passcode structure rules (e.g., passcode character requirements including minimum and/or maximum characters, character type requirements including number of numeric or special characters required and the like) and passcode expiration rules (e.g., period during a passcode is valid or the like).

In response to identifying the passcode rules, at Event 1130, each of the passcodes are monitored for an occurrence of a date associated with the passcode expiration rules and, in response to monitoring resulting in the occurrence of the data associated with the passcode expiration rules, at Event 1140, the passcode is automatically changed to a first updated passcode in accordance with the passcode rules, such as passcode structure rules and the like. In response to changing the passcode, at Event 1150, the passcode stored in the passcode vault is replaced with the first updated passcode. As such, as a result of the passcode changing in an automated manner, without user input or, in some embodiments, without user confirmation, the user is assured that the passcode being presented is a valid passcode and avoids the need to change an expired passcode at the time of passcode entry (i.e., when the user desires access to the computing device, network, application, web site/service or the like). In alternate embodiments of the method, the entities associated with the passcodes are monitored for security threats and, in response to the monitoring resulting in a security threat (e.g., passwords comprised or the like), the passcode is automatically changed to a further updated passcode in accordance with the passcode rules. In other alternate embodiments of the method, the entities associated with the passcodes are monitored for changes to the passcode rules and, in response to monitoring determining a change in passcode rules, the stored passcode rules are updated to reflect the change in the passcode rules and subsequent passcode changes occur in accordance with the updated passcode rules.

Referring to FIG. 9, a flow diagram is depicted of a method 1200 for computing login management, in accordance with embodiments of the present invention. At Event 1210, a user input is received from a user that defines an apparatus login passcode for a first computing apparatus, such as a mobile device. In response the receiving the user input, at Event 1220, a verification process determines whether the user input whether the user input matches a predefined apparatus login passcode. In response to the verification determining that the user input matches the predefined apparatus login passcode, at Event 1230, the (i) first computing apparatus and (ii) a passcode vault stored on or accessible to the first computing apparatus are unlocked. The passcode vault stores a plurality of first passcodes, each first passcode is associated with a (i) a computing device, (ii) a network, (iii) an application, or (iv) a web site/service.

Unlocking the passcode vault provides for automatically (i) retrieving a corresponding first passcode from the passcode vault when the user requests access to an application, a network, or a web site/service having the corresponding first passcode stored in the first passcode vault and (ii) inputting the corresponding first passcode at the application, network, web site/service to grant the user access to the application, network or web site/service absent user input. In other words, the login process occurs in the background without user input and, in some instances, without user knowledge.

In response to unlocking the passcode vault, at Event 1240, machine-learning (ML) model(s) are executed using, at least, a first computing apparatus identifier as an input, to identify login pattern(s) from amongst login patterns associated with the user and learned by the ML model(s). The login pattern(s) include login for (i) computing devices, (ii) networks, (iii) applications, and/or (iv) a web sites/services.

In response to identifying the login pattern(s), at Event 1250, first passcodes are retrieved from the unlocked passcode vault that are associated with the (i) computing devices, (ii) networks, (iii) applications, and/or (iv) a web sites/services included in the login patterns.

Prior to the user initiating access to the (i) computing devices, (ii) networks, (iii) applications, and/or (iv) a web sites/services included in the login patterns, at Event 1260, the (i) computing devices, (ii) networks, (iii) applications, and/or (iv) a web sites/services included in the login patterns are accessed and the first passcodes applied in the sequence defined in the login pattern(s) to grant the user pre-access authorization to the (i) computing devices, (ii) networks, (iii) applications, and/or (iv) a web sites/services included in the login patterns absent further user input.

Thus, present embodiments of the invention discussed in detail above, the present invention provides for automated updating/changing of passcodes based on expiration or an impending expiration of the passcode, and, in some embodiments, security threats associated with the underlying network, application or web site/service. In this regard, passcode rules for passcodes stored in the passcode vault are identified, including passcode structure rules and passcode expiration rules. Subsequently the expiration dates trigger automatic update/change of the passcodes in accordance with the passcode structure rules. Additionally, networks, applications and/or web sites/services associated with the passcodes may be monitored for security threats, which, when detected, trigger automatic update/change of the passcodes in accordance with the passcode structure rules. Such updating/changing of the passcodes may be transparent to the users or the users may receive notification alerts. In further embodiments of the networks, applications and/or web sites services are monitored for changes to their respective passcode rules, such that future automated passcode updates/changes may occur in accordance with the updated passcode rules.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for passcode management, the system comprising:

a computing platform including a memory and one or more computing processor devices in communication with the memory; and a passcode vault stored in the memory and configured to store a plurality of passcodes, each of the plurality of passcodes associated with one chosen from the group consisting of (i) a computing apparatus, (ii) a network, (iii) an application and (iii) a website or web service; and a passcode management application stored in the memory, executable by at least one of the one or more computing processor devices and configured to:

identify a passcode stored in the passcode vault, and store passcode rules related to a structure of the passcode and an expiration of the passcode, wherein the passcode is from the plurality of passcodes, based on the passcode rules related to the expiration of the passcode, monitor for an occurrence of a date associated with expiration of the passcode, in response to the monitoring resulting in the occurrence of the date associated with the expiration of the passcode, automatically change, in accordance with the passcode rules related to the structure of the passcode, the passcode to a first updated passcode, replace, in the passcode vault, the passcode with the first updated passcode, in response to entering the first updated passcode into the passcode vault, identify and store passcode rules related to the structure of the passcode and the expiration of the passcode, wherein the passcode rules related to the structure of the passcode include minimum passcode character length, special character requirements and character case requirements and wherein the passcode rules related to the expiration of the passcode include an expiration period, in response to authorizing access to the passcode vault for a user, execute one or more machine-learning models trained to learn login patterns for the user to identify, based on at least a computing apparatus identifier, a login pattern that defines an ordered sequence of two or more targets chosen from (i) computing devices, (ii) networks, (iii) applications, and (iv) websites or web services, and, prior to the user initiating access to the ordered sequence of targets, automatically access the ordered sequence of targets and apply, from the passcode vault, corresponding passcodes associated with the ordered sequence of targets to provide pre-access authorization for the user at the ordered sequence of targets absent further user input.

2. The system of claim 1, wherein the passcode management application is further configured to identify the passcode rules related to the structure of the passcode and the expiration of the passcode by (i) accessing a corresponding computing apparatus or application or (ii) crawling a corresponding website to obtain the passcode rules.

3. The system of claim 1, wherein the passcode management application is further configured to monitor for the occurrence of the date associated with expiration of the passcode, wherein the date associated with expiration of the passcode is a first date coinciding with an end of the expiration period or a second date occurring a predetermined number of days prior to the end of the expiration period.

4. The system of claim 1, further comprising a security threat monitoring application stored in the memory, executable by at least one of the one or more computing processor devices and configured to:

monitor at least one of computing devices, applications and websites have corresponding passcodes stored in the passcode vault for occurrences of security threats, in response to the monitoring resulting in an occurrence of a security threat, invoke the passcode management application to automatically change, in accordance with the passcode rules related to the structure of the passcode, an existing passcode to a second updated passcode that is different than the existing passcode, and replace, in the passcode vault, the existing passcode with the second updated passcode.

5. The system of claim 1, further comprising a passcode rules monitoring application stored in the memory, executable by at least one of the one or more computing processor devices and configured to:

monitor at least one of computing devices, applications and websites have corresponding passcodes stored in the passcode vault for changes to the passcode rules, in response to the monitoring resulting in changes to the passcode rules, replace the currently stored passcode rules with the updated passcode rules that reflect the changes, and conduct subsequent changes to an existing passcode in accordance with the updated passcode rules.

6. The system of claim 1, wherein the passcode management system is further configured to generate an alert, and initiate communication of the alert to a user, prior to or after a change in the passcode that notifies the user that a passcode change will occur or has occurred.

7. The system of claim 6, wherein the passcode management system is further configured to generate and initiate communication of the alert after a change in the passcode, wherein the alert includes a hyperlink that provides a passcode holder access to the passcode.

8. A computer-implemented method for passcode management, the method being executable by one or more computing processor devices and comprising:

for each passcode stored in a passcode vault, identifying and storing passcode rules related to (i) a structure of the passcode and (ii) an expiration of the passcode, wherein the passcode vault stores one or more passcodes, and wherein the passcode is from the one or more passcodes;

based on the passcode rules related to the expiration of the passcode, for each of the one or more passcodes, monitoring for an occurrence of a date associated with expiration of the passcode;

in response to the monitoring resulting in the occurrence of the date associated with the expiration of the passcode, automatically changing, in accordance with the passcode rules related to the structure of the passcode, the passcode to a first updated passcode;

replacing, in the passcode vault, the passcode with the first updated passcode;

in response to entering the first updated passcode into the passcode vault, identifying and storing passcode rules related to the structure of the passcode and the expiration of the passcode, wherein the passcode rules related to the structure of the passcode include minimum passcode character length, special character requirements and character case requirements and wherein the passcode rules related to the expiration of the passcode include an expiration period; and in response to authorizing access to the passcode vault for a user, executing one or more machine-learning models trained to learn login patterns for the user to identify, based on at least a computing apparatus identifier, a login pattern that defines an ordered sequence of two or more targets chosen from (i) computing devices, (ii) networks, (iii) applications, and (iv) websites or web services, and, prior to the user initiating access to the ordered sequence of targets, automatically access the ordered sequence of targets and apply, from the passcode vault, corresponding passcodes associated with the ordered sequence of targets to provide pre-access authorization for the user at the ordered sequence of targets absent further user input.

9. The computer-implemented method of claim 8, wherein identifying the passcode rules further comprises (i) accessing a corresponding computing apparatus or application to obtain the passcode rules or (ii) crawling a corresponding website to obtain the passcode rules.

10. The computer-implemented method of claim 8, wherein monitoring for the occurrence of the date associated with expiration of the passcode further comprises monitoring for at least one a first date coinciding with an end of the expiration period or a second date that is a predetermined number of days prior to the end of the expiration period.

11. The computer-implemented method of claim 8, further comprising:

monitoring computing devices, applications and websites have corresponding passcodes stored in the passcode vault for occurrences of security threats;

in response to the monitoring resulting in an occurrence of a security threat, automatically changing, in accordance with the passcode rules related to the structure of the passcode, an existing passcode to a second updated passcode that is different than the existing passcode; and replacing, in the passcode vault, the existing passcode with the second updated passcode.

12. The computer-implemented method of claim 8, further comprising:

monitoring computing devices, applications and websites have corresponding passcodes stored in the passcode vault for changes to the passcode rules;

in response to the monitoring resulting in changes to the passcode rules, replacing the currently stored passcode rules with the updated passcode rules that reflect the changes; and conducting subsequent changes to an existing passcode in accordance with the updated passcode rules.

13. A computer program product comprising:

a non-transitory computer-readable medium comprising sets of codes for causing one or more computing devices to:

for each passcode stored in a passcode vault, identify and store passcode rules related to (i) a structure of the passcode and (ii) an expiration of the passcode, wherein the passcode vault stores one or more passcodes, and wherein the passcode is from the one or more passcodes;

based on the passcode rules related to the expiration of the passcode, for each of the one or more passcodes, monitor for an occurrence of a date associated with expiration of the passcode;

in response to the monitoring resulting in the occurrence of the date associated with the expiration of the passcode, automatically change, in accordance with the passcode rules related to the structure of the passcode, the passcode to a first updated passcode;

replace, in the passcode vault, the passcode with the first updated passcode;

in response to entering the first updated passcode into the passcode vault, identifying and storing passcode rules related to the structure of the passcode and the expiration of the passcode, wherein the passcode rules related to the structure of the passcode include minimum passcode character length, special character requirements and character case requirements and wherein the passcode rules related to the expiration of the passcode include an expiration period; and in response to authorizing access to the passcode vault for a user, execute one or more machine-learning models trained to learn login patterns for the user to identify, based on at least a computing apparatus identifier, a login pattern that defines an ordered sequence of two or more targets chosen from (i) computing devices, (ii) networks, (iii) applications, and (iv) websites or web services, and, prior to the user initiating access to the ordered sequence of targets, automatically access the ordered sequence of targets and apply, from the passcode vault, corresponding passcodes associated with the ordered sequence of targets to provide pre-access authorization for the user at the ordered sequence of targets absent further user input.

14. The computer program product of claim 13, wherein the set of codes for causing the one or more computing devices to identify the passcode rules further cause the one or more computing devices to (i) access corresponding computing apparatus or application to obtain the passcode rules or (ii) crawl a corresponding website to obtain the passcode rules.

15. The computer program product of claim 13, wherein the set of codes for causing the one or more computing devices to monitor for the occurrence of the date associated with expiration of the passcode further causes the one or more computing devices to monitor for at least one a first date coinciding with an end of the expiration period or a second date that is a predetermined number of days prior to the end of the expiration period.

16. The computer program product of claim 13, wherein the sets of codes further comprise sets of codes for causing the one or more computing devices to:

monitor computing devices, applications and websites have corresponding passcodes stored in the passcode vault for occurrences of security threat;

in response to the monitoring resulting in an occurrence of a security threat, automatically change, in accordance with the passcode rules related to the structure of the passcode, an existing passcode to a second updated passcode that is different than the existing passcode; and replace, in the passcode vault, the existing passcode with the second updated passcode.

17. The computer program product of claim 13, wherein the sets of codes further comprise sets of codes for causing the one or more computing devices to:

monitor computing devices, applications and websites have corresponding passcodes stored in the passcode vault for changes to the passcode rules;

in response to the monitoring resulting in changes to the passcode rules, replace the currently stored passcode rules with the updated passcode rules that reflect the changes; and conduct subsequent changes to an existing passcode in accordance with the updated passcode rules.

* * * * *